(12) United States Patent
Williams

(10) Patent No.: US 6,532,701 B2
(45) Date of Patent: Mar. 18, 2003

(54) SHELTER SYSTEM OF CLUSTERED MODULAR ENCLOSURES

(76) Inventor: Robert Edward Williams, P.O. Box 152, Llano, CA (US) 93544

( * ) Notice: Subject to any disclaimer, the term of this patent is extended or adjusted under 35 U.S.C. 154(b) by 0 days.

(21) Appl. No.: 09/960,027

(22) Filed: Sep. 20, 2001

(65) Prior Publication Data

US 2002/0056247 A1 May 16, 2002

Related U.S. Application Data

(60) Provisional application No. 60/235,233, filed on Sep. 25, 2000.

(51) Int. Cl.$^7$ .............................. E04B 1/12; E04H 15/00
(52) U.S. Cl. .............................. 52/71; 52/641; 52/646; 52/82; 52/36.1; 52/79.4; 135/121; 135/122; 135/151; 135/99
(58) Field of Search .............................. 52/641, 646, 71, 52/82, 36.1, 79.4, 604, 63; 135/121, 122, 99, 151

(56) References Cited

U.S. PATENT DOCUMENTS

| | | | |
|---|---|---|---|
| 536,435 A | | 5/1895 | MacDonald |
| 727,541 A | | 5/1903 | Hayes |
| 1,106,624 A | | 8/1914 | Cadwallader et al. |
| 2,051,643 A | | 8/1936 | Morrison |
| 2,886,855 A | | 5/1959 | Petter |
| 3,375,831 A | * | 4/1968 | Serbus .............................. 135/99 |
| 3,766,693 A | * | 10/1973 | Richards, Jr. et al. .............................. 52/71 |
| 3,952,463 A | * | 4/1976 | Lane .............................. 52/82 |
| 3,974,600 A | | 8/1976 | Pearce .............................. 52/81.2 |
| 4,016,833 A | | 4/1977 | Ray .............................. 119/498 |
| 4,067,547 A | | 1/1978 | Peters .............................. 256/23 |
| 4,068,404 A | | 1/1978 | Sheldon .............................. 47/26 |
| RE30,044 E | | 7/1979 | Huddle .............................. 52/63 |
| 4,546,583 A | | 10/1985 | Hussar .............................. 52/236.1 |
| 4,896,165 A | | 1/1990 | Koizumi .............................. 343/881 |
| 5,154,032 A | | 10/1992 | Ritter .............................. 52/592.1 |
| 5,448,868 A | | 9/1995 | Lalvani .............................. 52/648.1 |
| 5,551,372 A | | 9/1996 | Nicholls .............................. 119/474 |
| 5,806,547 A | * | 9/1998 | Derlinga .............................. 135/99 |
| 5,829,941 A | | 11/1998 | Zamorano et al. .............................. 414/261 |
| 5,884,437 A | | 3/1999 | Olsen .............................. 52/79.4 |
| 6,009,891 A | * | 1/2000 | Surface et al. .............................. 135/99 |
| 6,073,587 A | | 6/2000 | Hill et al. .............................. 119/474 |
| 6,123,321 A | | 9/2000 | Miller .............................. 256/25 |
| 6,283,136 B1 | * | 9/2001 | Chen .............................. 135/122 |

OTHER PUBLICATIONS

Robert Williams *The Geometrical Foundation of Natural Structure* Dover:1978 pp. 31–41.

* cited by examiner

*Primary Examiner*—Carl D. Friedman
*Assistant Examiner*—Nahid Amiri

(57) ABSTRACT

A prefabricated, modular shelter system that utilizes a series of identical enclosures, each made from barrier panels connected to define the shape of a modifiable dodecagon prism. The top cover of each enclosure can be flat or peaked at the center. The lightweight components are easily transported, assembled, disassembled, and/or re-assembled. The design allows two or many enclosures to cluster together without interstitial triangle prism volumes forming among them. Interior space within a cluster of enclosures can be increased, decreased, or re-arranged by simple addition, removal, or relocation of enclosures. Though the enclosures are each identical in shape, they can create a limitless variety of spatial areas and configurations, thus adapting to varied uses and requirements.

3 Claims, 5 Drawing Sheets

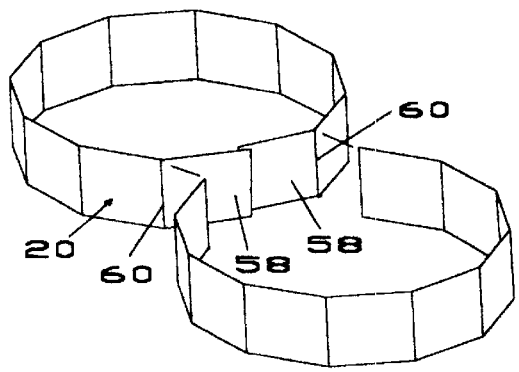
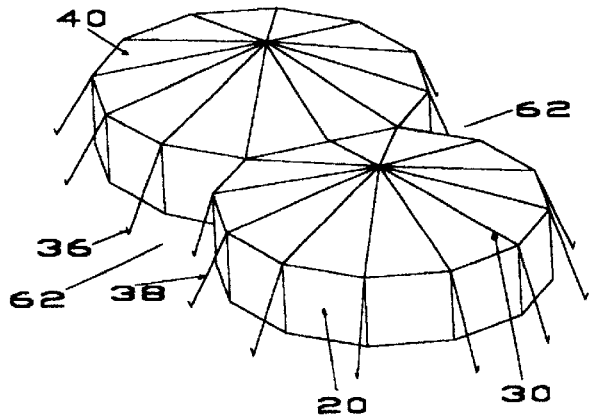
Fig. 8A Fig. 8B
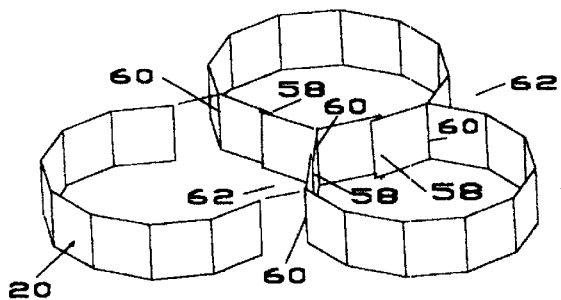
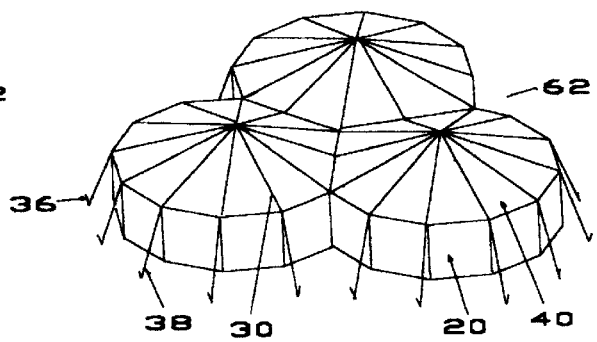
Fig. 9A Fig. 9B
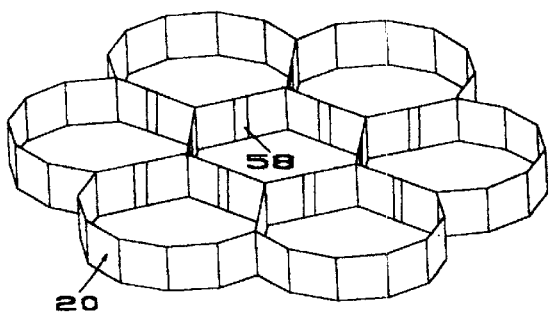
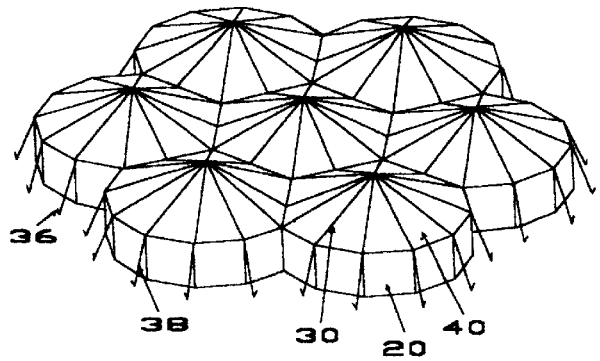
Fig. 10A Fig. 10B

SHELTER SYSTEM OF CLUSTERED MODULAR ENCLOSURES

CROSS-REFERENCE TO RELATED APPLICATIONS

This application is entitled to the benefit of Provisional Patent Application Ser. No. 60/235,233 filed Sep. 25, 2000.

BACKGROUND

1. Field of Invention

This invention relates to structures and enclosures for the protective containment and protection of goods, vegetation or animals from the elements or outside predators; and for the containment of predator beings from the outside world.

2. Description of Prior Art

Many fields of human endeavor make use of physical barriers that separate, protect, and/or contain goods, vegetation, or animals. The barriers can be as basic as a fence or more complex enclosures, such as corrals or cages or actual buildings.

Prior patents for shelters and enclosures of one type or another are principally based on orthogonal 90-degree ground plans in which a square or rectangle (or groups of squares or rectangles) are marked on the ground. Then square or rectangular shelters and enclosures are constructed on this ground plan. This 90-degree way of thinking is traditional in Western society and generally considered the simplest way of approaching the issue. It is so engrained into our thinking that it has become the unconscious background assumption from which we approach most problems of designing such shelters. I will show that the use of orthogonal 90-degree ways of defining spatial enclosures is inherently more wasteful of materials than are plans based on a different geometrical premise.

There have been, over the years, a few patents issued for building and shelter systems using geometries other than the 90-degree systems. They are not widely used principally because they have been shown to be very complicated, high-tech modular systems. In short, they are costly to produce, construct, and maintain in a reliable way.

Several types of animal and plant enclosures have been proposed. For example: U.S. Pat. No. 727,541 to Hayes (1903), U.S. Pat. No. 2,051,643 to Morrison (1936), U.S. Pat. No. 4,016,833 to Ray (1977), U.S. Pat. No. 4,067,547 to Peters (1978), U.S. Pat. No. 4,068,404 to Sheldon (1978), U.S. Pat. No. 5,551,372 to Nicholls (1996), U.S. Pat. No. 6,073,587 to Hill, et al (2000), U.S. Pat. No. 6,283,136 Bi to Chen (2001), are examples of shade structures, corral fences, cages, and shelters based on an orthogonal 90-degree ground plan layout pattern and ways of fabricating enclosures. Though coninon, the orthogonal plan layout pattern remains a wasteful way to enclose an area of ground space, and is, therefore, an inefficient way to make modular clustered enclosures. The basic reason for this wastefulness is that a square requires more perimeter length to enclose a certain area than do other useful polygons.

In previous efforts to improve efficiency, patents such as U.S. Pat. No. 2,886,855 to Petter (1959), U.S. Pat. No. 3,974,600 to Pearce (1976), U.S. Pat. No. 5,448,868 to Lalvani (1995), offer interesting, though complicated, high-tech systems for the fabrication and construction of enclosures. Systems such as these, if actually produced would be extremely costly to fully develop as well as complicated and difficult to construct.

Fundamental Geometric Considerations:

It is a universally known geometric fact that, on a planar surface, a circle encloses the greatest possible area with the minimum amount of perimeter length. At the opposite end of the scale, and within the family of regular polygons, an equilateral triangle is known to enclose the least interior surface area with the greatest amount of perimeter length. Each member of the family of regular polygons falls between these polar limits.

TABLE 1

Certain Selected Polygons-Percentage of Increased Perimeter Length Required to Enclose an Identical Interior Area.

| Polygon | % increase of perimeter length to enclose unit area |
| --- | --- |
| Circle | 0% |
| Dodecagon (12-edges) | 1.0% |
| Decagon (10-edges) | 1.2% |
| Octagon (8-edges) | 2.7% |
| Hexagon (6-edges) | 5.0% |
| Pentagon (5-edges) | 8.0% |
| Square (4-edges) | 13.0% |
| Triangle (3-edges) | 29.0% |

See: Williams, Robert. *The Geometric Foundation of Natural Structure: A Sourcebook of Design.* New York: Dover. 1978. Pp. 31–41.

As can be seen from the above table, the basic geometry of the square requires 13% more perimeter length to enclose the same interior area as does the circle. The 90-degreeness of the square has an inherent inefficiency when compared to a circle and other polygons.

It is true that within the orthogonal family itself, the square is the most efficient geometric form. For example, only 16 miles of perimeter fencing is required to enclose 16 square miles of area with a square four miles on a side, while 34 miles of perimeter fencing is required to enclose 16 square miles of area with a rectangle that is 1 mile by 16 miles. From this brief discussion it can be understood that if one wishes to fence or enclose a certain area efficiently, the use of a circular ground plan would be the most efficient way to accomplish the task. The issue changes only slightly if one wishes to enclose an area with clustered multiple polygons.

When circles are clustered together, an interstitial area appears among every three clustered circles. In this instance, the circle loses some of its efficiency because of the interstitial areas. Though this wasteful condition is somewhat remedied by clustering squares or rectangles, other more efficient remedies immediately present themselves (see Table 1).

Of the family of regular polygons, only three—the triangle, the square, and the hexagon—possess the geometry necessary to cluster identical polygons together to cover a planar area without leaving open interstitial areas among them. (Williams. 1978. Op. cit. Pp. 35–6) From Table 1 it can be extrapolated that a clustering of hexagons would require less total perimeter length to cover a given area than either a clustering of squares or a clustering of triangles.

Now consider altering clusters of triangles, squares, and hexagons to become clusters of triangle prisms, square prisms (boxes), and hexagon prisms. The same relationships regarding their relative economies hold true. A clustering of hexagonal prisms would require less perimeter surface areas than either a cluster of triangle prisms or square prisms.

In prior art, some examples of enclosures with hexagonal ground plans are U.S. Pat. No. 4,546,583 to Hussar (1985), U.S. Pat. No. 4,896,165 to Koizumi (1990), and U.S. Pat.

No. 5,884,437 to Olsen (1999). While these examples of show an increased efficiency in perimeter area over the orthogonal 90-degree systems of square prisms, I will show that even more efficient clustered enclosures are possible with the combined use of 12-sided dodecagons and dodecagon prisms that are modified slightly as they cluster together, to become hexagonal prisms. It is with the combined use of the geometry of both the hexagon and the dodecagon that the greatest efficiency of perimeter length to area enclosed by clustered polygons can be achieved.

The dodecagon has appeared only three times in patents relating to shelter or building constructions systems. U.S. Pat. No. 5,829,941 to Morfin & Rodolfo (1998) shows a stacked structure with a twelve-sided perimeter for an automated parking garage. U.S. Pat. No. 5,154,032 to Ritter (1992) makes use of the dodecagon prism as part of a module for small building blocks. U.S. Pat. No. 3,766,693 to Richards, et al. (1973) describes a shelter with two different sizes of dodecagon, one at floor level and a larger on at the top plate of the structure.

In each of these three cases the use of the dodecagon as a design factor is a random selection of a polygon. For example, each patent would work equally well with a polygon of 18 sides, at taught in U.S. Pat. No. 3,375,831 to Serbius (1968); or a polygon of ten sides at taught in U.S. Pat. No. 3,952,463 to Lane (1976); or a polygon of six sides as taught in U.S. Pat. No. 5,806,547 to Derlinga (1998); or a polygon of eight sides at taught in U.S. Pat. No. 6,009,891 to Surface, et al. (2000). The choice of polygon in each of the above patents was an arbitrary choice. Any polygon can be substituted without negatively effecting the patents.

SUMMARY

In accordance with the present invention, a shelter system ccu[]rising a plurality of individual clustered modular enclosures, each enclosure defining a modifiable dodecagon prism, the prisIr[] clustered such that: (1) a maximum of exactly six surround one, (2) the manner of aggregation eliminates triangle interstitial volumes.

Objects and Advantages

Accordingly, several objects and advantages of the present invention are:

(a) To provide a system of clustered modular enclosures in which each enclosure in a cluster encloses the greatest possible interior floor area with the least amount of perimeter panel surface area.
(b) To provide a system of clustered modular enclosures composed of a minimum inventory of standardized modular components of strong and lightweight materials.
(c) To provide a system of clustered modular enclosures, which are relatively easy to assemble by one person with a minimum of tools.
(d) To provide a system of clustered modular enclosures, which can be easily anchored to the ground for long term use at a specific site.
(e) To provide a system of clustered modular enclosures, which is resistant to severe environmental factors, such as intense heat and cold, winds and earthquakes.
(f) To provide a system of clustered modular enclosures in which additional enclosures can be easily added to an existing cluster of enclosures, as needed, thereby expanding the interior space.
(g) To provide a system of clustered modular enclosures in which single enclosures can be easily removed from an existing cluster or be relocated to another area of a cluster, thereby contracting the interior space.
(h) To provide a system of clustered modular enclosures in which the standardized modular components are re-usable.
(i) To provide a system of clustered modular enclosures, which have the inherent ability to be close-clustered, thereby allowing a maximum of six enclosures to surround any individual enclosure.
(j) To provide a system of clustered modular enclosures, which have the ability to be random-clustered, whereby the enclosures can be located in a manner to avoid encapsulating trees, buildings, and the like.
(k) To provide a system of clustered modular enclosures in which the interior barrier panels can be opened to create a single or numerous larger interior spaces.
(l) To provide a system of clustered modular enclosures in which an entire cluster, or selected portions of a cluster, can be disassembled, moved, and reassembled in another location.
(m) To provide a system of clustered modular enclosures, which function reliably with low maintenance.

Further objects and advantages are to provide a system of clustered modular enclosures which are simple to use and relatively inexpensive to manufacture. Further objects and advantages will present themselves from a consideration of the following description and drawings.

DRAWING FIGURES

FIGS. 8A and 8B shows 2-clustered enclosures.

FIGS. 9A and 9B shows 3-clustered enclosures.

FIGS. 10A and 10B shows 7-clustered enclosures.

Figure 1:
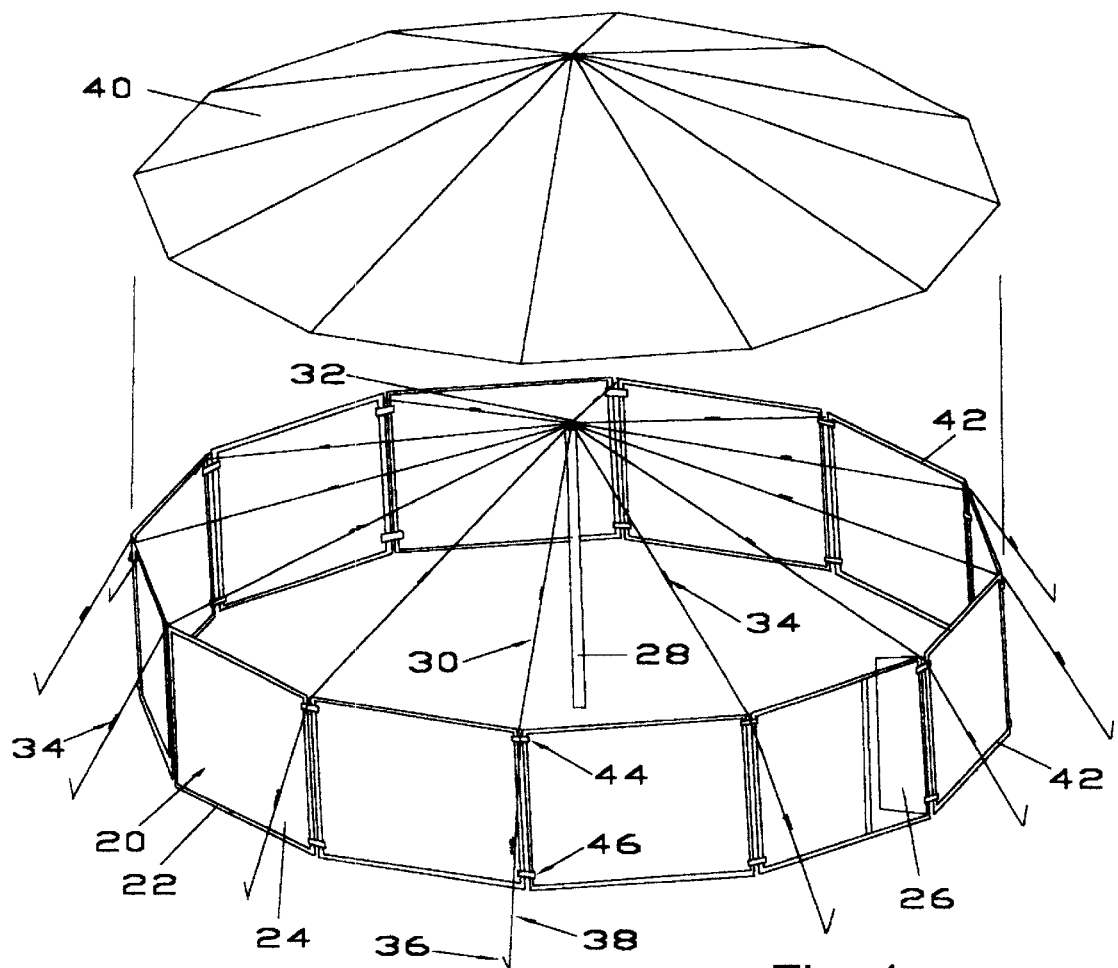
FIG. 1 shows a single enclosure.
Figure 2A:
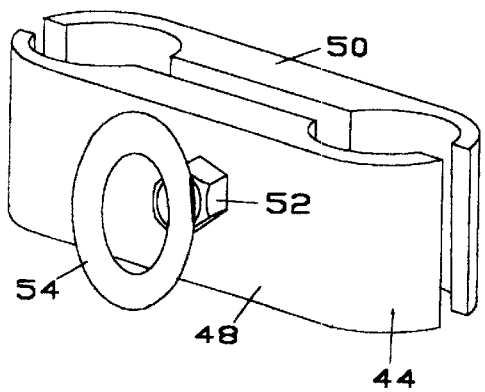
FIGS. 2A and 2B shows clamps for connecting barrier panels.
Figure 2B:
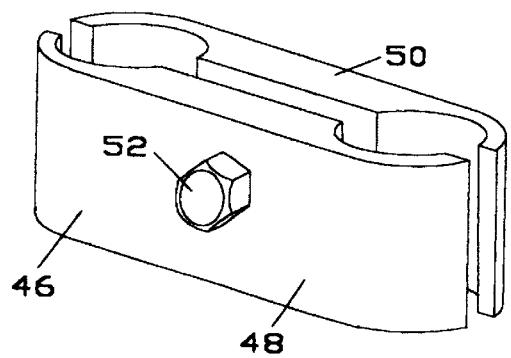
Figure 3:
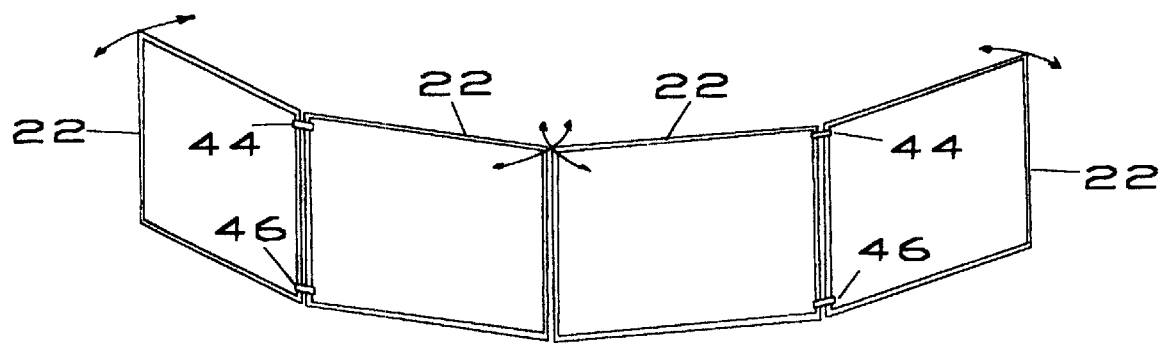
FIG. 3 shows the hinged motion of barrier panel frames.

REFERENCE NUMERALS IN DRAWINGS 20 barrier panel assembly
22 structural perimeter frame
24 barrier panel interior surface
26 access door
28 post
30 tension member
32 tension members at top of post
34 turnbuckle
36 ground anchor means
38 tension member
40 top cover
42 dodecagon perimeter boundary of an enclosure
44 top clamp
46 bottom clamp
48 clamp front plate
50 clamp back plate 52 bolt
54 ring device
56 triangle prism
58 interface
60 interface outer edge
62 indentation area
64 dodecagon prism
66 hexagon prism

DESCRIPTION

FIGS. 1 through 4—Preferred Embodiment

A preferred embodiment of my invention is a shelter system of modular space enclosing cages or paneled enclosures that can cluster together in a highly economical way. Each individual enclosure (FIG. 1) has a basic perimeter boundary 42 in the shape of a dodecagon. Each individual enclosure is made of twelve barrier panels 20 connected to form the shape of a modifiable dodecagon prism. The unique method of clustering two or more enclosures allows for the complete removal of from two to many barrier panels 20 depending on the number of enclosures in a cluster. In addition, the close-clustering of three or more enclosures causes the interstitial wasted spaces, usually formed among any three close-clustered enclosures of similar dodecagon geometry, to disappear completely. Thus, the shelter system becomes increasingly more economical as more space is enclosed.

The components of the shelter system are preferably modular. The major components are securely joined, though easily detachable from one another. Thus the enclosures are adapted for convenient disassembly, transport, and re-assembly.

An Individual Enclosure (FIG. 1) is Constructed From Five Groups of Components:

(1) An assembly of twelve orthogonal barrier panels 20. Each barrier panel consists of a structural perimeter frame 22 with suitably attached interstitial fence, grill, great, rigid or flexible wall or other barrier surface 24. An access door 26 is provided on one or more barrier panels 20 on an enclosure.

(2) A post 28, equal to or somewhat higher than the vertical height of assembled barrier panels 20. Twelve tension members 30 are suitably attached at or near the top end 32 of post 28. In the preferred embodiment of my invention, tension members 30 are cables welded to post 28 or ropes tied to post 28. A turnbuckle 34 is located at the approximate center of each tension member 30.

(3) Twelve ground-anchor means 36, each with a tension member 38 suitably connected into the ground. In the preferred embodiment, anchor means 36 is a stake or a screw-anchor with thimble eye at the exposed top end. A turnbuckle 34 is located at the approximate center of each tension member 38.

(4) A top cover 40, made substantially of a suitable modular or foldable material, net, or grill and preferably extending to the top perimeter boundary 42 of enclosure (FIG. 1). Top cover 40 is attached to top perimeter boundary 42 by ropes, clips, rings, or other suitable attachment means.

(5) Various attachment means, such as clamps (FIGS. 2A, 2B), "nicol" clips, "hog rings", shackles, turnbuckles, ropes, twine, and cables to conveniently attach components to one another and to allow for the simple detachment of components from one another.

Figure 4:
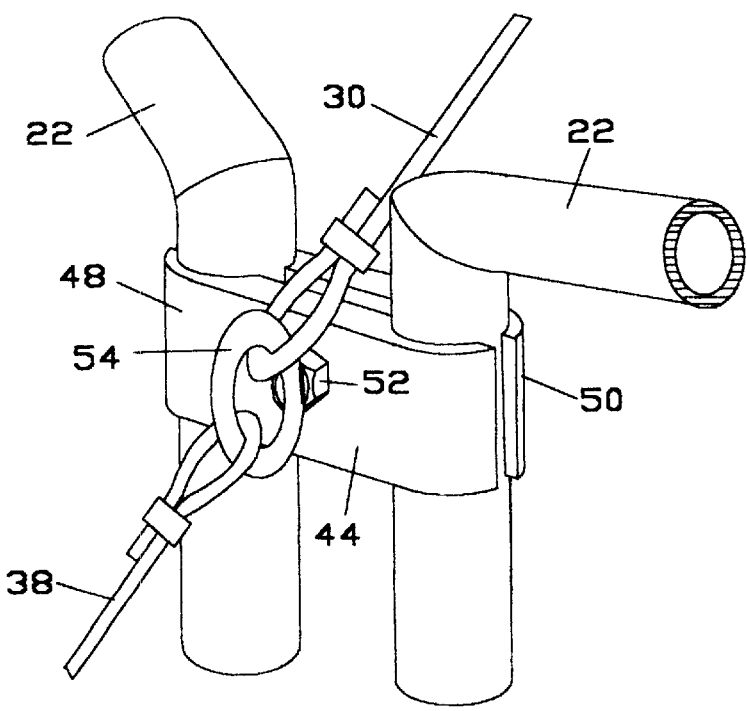
FIG. 4 shows the connection of tension members to a ring device and top clamp at the corner of two barrier panel frames.
Figures 5A, 5B:
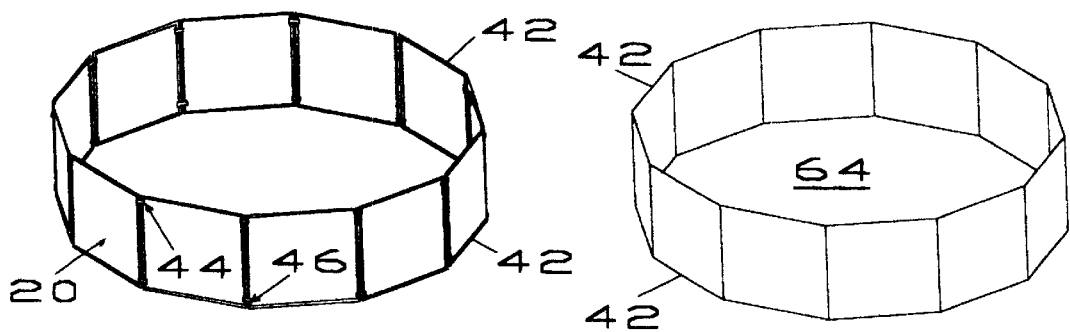
FIGS. 5A and 5B shows the basic dodecagon prism form of twelve connected barrier panels.

An Individual Enclosure (FIG. 1) is Assembled in the Following Way:

(1) Each barrier panel 20 is connected to two other barrier panels along opposite parallel edges of frame 22 with clamps 44, 46 located near the top and bottom of joined panel frames 22. In a preferred embodiment, clamps 44, 46 allow for possible rotation (FIG. 3) of any two barrier panels 20 about a pivot axis parallel to connected edges of frames 22. Each of clamps 44, 46 is made of a front plate 48, a back plate 50, and a bolt 52. Top clamp 44 is fitted with a ring device 54 welded to bolt 52. Tension members 30, 38 are attached to device 54 (FIG. 4). Twelve suitably connected barrier panels 20 (FIG. 5A) define the shape of a dodecagon prism 64 (FIG. 5B).

(2) In a preferred embodiment, post 28 is approximately vertical and placed at the approximate center of the enclosed space defined by twelve connected barrier panels 20. Each tension member 30 ties post 28 with one upper corner of perimeter boundary 42 at device 54 of clamp 44.

(3) Each of twelve ground-anchor means 36 is located outside perimeter 42 of enclosure (FIG. 1) at a distance away from the perimeter and approximately in line with post 28 and one pair of joined edges of two barrier panels 20. Each tension member 38 connects the ground-anchor means 36 with one upper corner of perimeter boundary 42 at device 54. Turnbuckles 34 are adjusted to establish equal tension to tension members 30, 38

(4) Top cover 40 is preferably stationed on top of the enclosure (FIG. 1). Alternatively, top cover 40 may connect to tension members 30 from below with ties, clips, "hog rings" or other suitable attachment means. In either case, the perimeter of top cover 40 attaches to perimeter boundary 42 with cords, ropes, "hog rings" or other suitable attachment means.

Figures 6A, 6B:
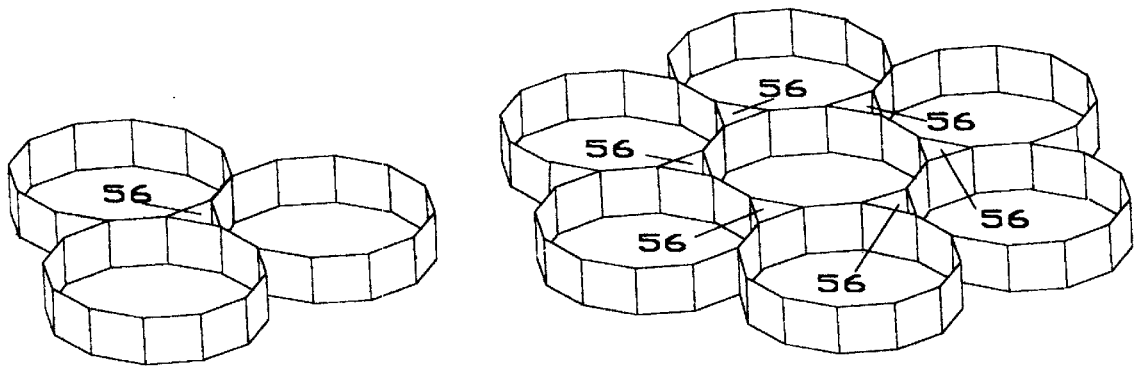
FIGS. 6A and 6B shows Prior Art planar clusters of dodecagon prisms with triangle prism interstitial volumes.

Geometric Considerations for Clusters of Modular Enclosures (FIGS. 5 Through 7):

In prior art (Williams. Op. cit. p. 39), when three or more dodecagon prisms are close-clustered together in a two-dimensional array (FIG. 6A), triangle prism interstitial volumes 56 appear within a cluster. In a two-dimensional array, it is possible for a maximum of six dodecagon prisms (FIG. 5B) to surround any given dodecagon prism and more triangle prism interstitial volumes 56 appear among them.

Figure 7:
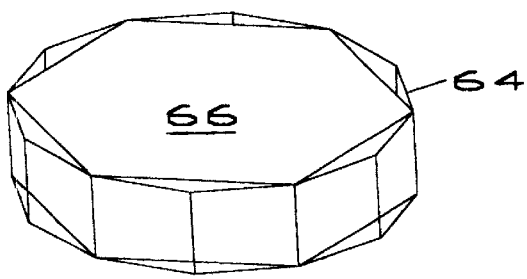
FIG. 7 shows the geometric relationship between a dodecagon prism and a hexagon prism.

My shelter system eliminates triangle prism volumes 56 among close-clustered dodecagon prisms by using a new combination of the geometries of both the dodecagon prism 64 and the hexagon prism 66. By connecting every other vertex of the top and bottom dodecagon boundaries 42 of a dodecagon prism 64, a hexagon prism 66 is defined (FIG. 7). By making use of the geometric relationship between these two prisms, it is possible co cluster them in a way that eliminates all triangle interstitial volumes 56.

A 2-Enclosure Cluster (FIGS. 8A and 8B) is Assembled in the Following Way:

Barrier panels 20 of a single enclosure (FIG. 1) assemble as previously described, except that one pair of barrier panels 20 are unconnected and rotate slightly toward the center of the enclosure until they are partially overlapped and become approximately parallel to one another (FIG. 8A). The nearly parallel, partially overlapped panels 20 define the interface 58 between two enclosures. The overlapped panels 20 connect together with clamp 44 at the top edges and clamp 46 at the bottom edges of frames 22. Barrier panels 20 of a second enclosure (FIG. 8A) are assembled as described previously, minus two barrier panels 20.

Panels 20 of the second enclosure are connected to panels 20 of the first enclosure at interface 58 made by two barrier panels 20 of the modified first enclosure. Clamps 44, 46 connect the two enclosures at the outer edges 60 of interface 58.

In a preferred embodiment, post 28, anchor means 36, tension members 30, 38, and top cover 40 are added to and suitably connected to each enclosure (FIG. 8B).

A Close-Clustered 3-Enclosure (FIGS. 9A and 9B) is Assembled in the Following Way:

At one of the two indentation areas 62 on a 2-enclosure (FIG. 9A), two pairs of barrier panels 20 are disconnected. Both pairs of two unconnected panels rotate slightly, each pair toward the center of their respective enclosure, until each pair overlap and become nearly parallel. The two panels 20 of each enclosure are connected with clamp 44 at the top edges and clamp 46 at the bottom edges. Two new interfaces 58 are thus defined.

Barrier panels 20 of a third enclosure are assembled as described previously, minus four barrier panels 20. These eight panels 20 of the third enclosure connect to panels of the two-cluster enclosure, such that the third enclosure meets at two interfaces 58 made at indentation area 62 of the two-cluster enclosure. Clamps 44, 46 connect the third enclosure to the two-cluster enclosure at interface outer edges 60.

In a preferred embodiment, post 28, anchor means 36, tension members 30, 38, and top cover 40 are added to and suitably connected to each enclosure. (FIG. 9B).

A Close-Clustered 7-Enclosure (FIGS. 10A and 10B) is Assembled in the Following Way:

In close-clustering, a maximum of six enclosures surrounds a single enclosure (FIG. 10A). In this kind of cluster, the central enclosure becomes modified from its original dodecagon prism shape 64 into the shape of a hexagonal prism 66. The interstitial triangle prisms 56 are non-existent.

In a preferred embodiment, post 28, anchor means 36, tension members 30, 38, and top cover 40 are added to and suitably connected to each enclosure. (FIG. 10B).

In any group of clustered enclosures, any or all of barrier panel surfaces 24 forming interior spaces may be removed to create larger open spaces inside any cluster. Access doors 26 can be added or removed, as necessary.

Figure 11:
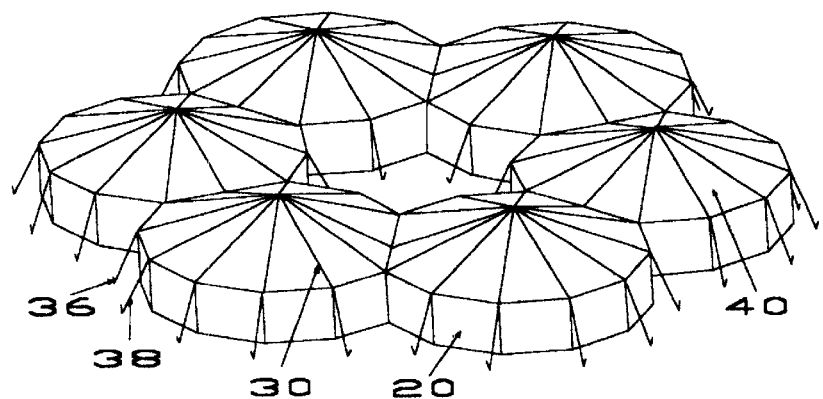
FIG. 11 shows an open cluster of six enclosures.
Figure 12:
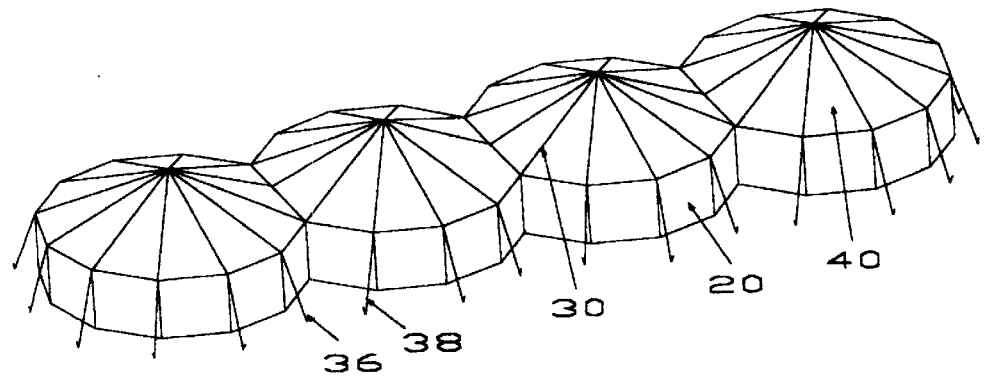
FIG. 12 shows a linear cluster of four enclosures.
Figure 13:
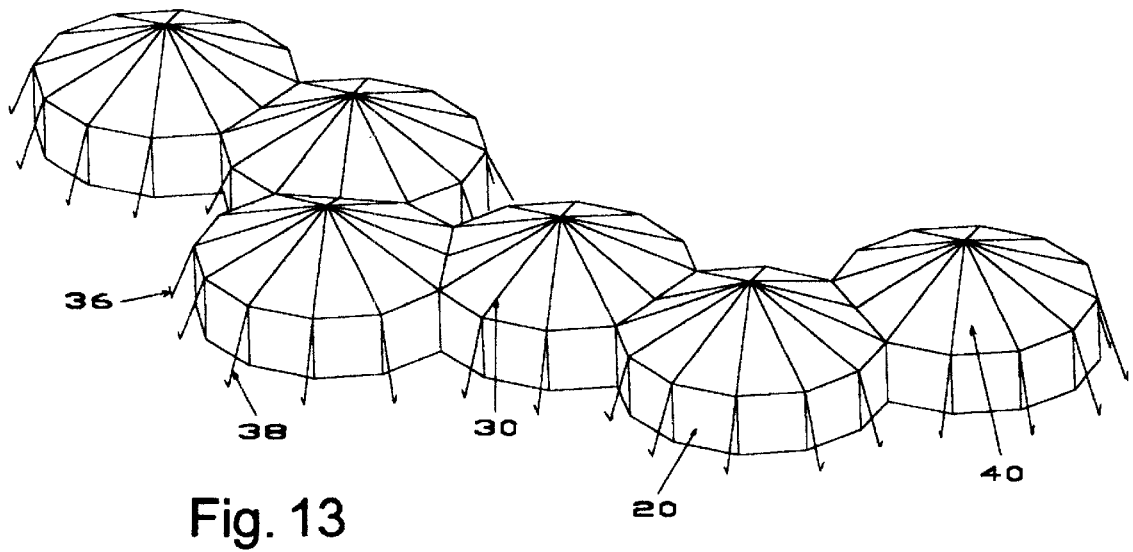
FIG. 13 shows a random cluster of six enclosures.

Examples of Other Possible Clusters of Enclosures:

Open-packed clusters (FIG. 11), linear clusters (FIG. 12), and/or random packings (FIG. 13) are a few of the many ways the enclosures can be clustered.

Though certain novel features of this invention have been described and drawn, it is understood that various omissions, substitutions and/or alterations in the forms and details of the invention and its operation can be made by those skilled in the art without departing from the spirit of the invention.

Advantages

From the above description, the reader can understand a number of advantages as evident:

(a) A basic enclosure can be prefabricated in large quantities and in many sizes;
(b) Clustered enclosures allow spaces to be modified dramatically or incrementally;
(c) Prefabrication of the simple components can keep production costs to a minimum;
(d) The shelter system can be used for many varied purposes: to contain birds and climbing animals, keep predators away from protected plants or animals, and many other uses;
(e) The components of the shelter system can be lightweight, thereby allowing a solitary person to be able to erect an enclosure or a cluster of enclosures with relative ease;
(f) Depending on requirements, the system can be prefabricated to allow sun, air, rain, and/or wind to flow inside. The system can also be made to be weatherproof.

Conclusion, Ramifications, and Scope

As the reader can appreciate, this shelter system of clustered modular enclosures is designed to be manufactured in numerous basic sizes and for many differing purposes. The system can be made in a size small enough to be carried by one person. On a small scale the system can be used as modular small animal cages or for protecting small plants from outside predation. The system can also be manufactured in sizes large enough to contain large animals. The system could be placed in a natural setting in an almost limitless variety of large clustered spatial configurations to protect, for example, young endangered animal and plant species from outside predation by birds and other predators.

The system's simplicity of design, its great flexibility of possible spatial configurations, and its lightweight modularity make the system ideal for ease of erection by one person with a minimum of commonly available tools. In any location, the system allows additional enclosures to be added, subtracted, and relocated with relative ease. It is reliable and relatively maintenance-free.

The system can also be manufactured with weatherproof top covering and barrier panels so that it can be used in emergency conditions for housing, hospitals, and the like. Even in these cases, the system retains its simplicity of erection and its flexibility of expansion, contraction, and relocation.

The components can be manufactured at low cost and can be re-used again and again.

Because of its special geometry the system offers great economy in the use of materials. It surpasses all of the 90-degree orthogonal systems, of tents, cages, and shelters in the basic economy of the use of materials. Because of its simplicity of design and small inventory of types of components, manufacturing costs can be kept to a minimum.

The system is, in addition, designed to touch the earth lightly: that is, the minimum perimeter boundary, the lightweight tension members and simple ground anchors allow for minimal disturbance in a natural setting. These features, particularly the ground anchors and tension members, thoroughly stabilize the enclosures and make them highly resistant to damage by severe weather, such as high winds and earthquakes. In short, all of the components of this strong and versatile shelter system can be manufactured at low cost and can be constructed with minimum impact on the environment. The components of the shelter system are re-useable, can be easily erected, modified, and moved to respond to many requirements and changing needs.

The above description of the varied uses and benefits of this shelter system of clustered modular enclosures should be viewed as illustrations of some of the preferred embodiments. The descriptions presented should not be construed as limiting the scope of the system.

I claim:

1. An expandable and contractible multi-purpose shelter system ccmprising a plurality of clustered enclosures; wherein each of said enclosures comprises:

(a) twelve orthogonal barrier panels, detachably connected to define a modifiable dodecagon prism,
(b) a rust at the approximate center of each said enclosure,
(c) twelve tension members, each having one end suitably connected near the top of said post, and the opposite end of each said tension mernbex suitably connected near one of the twelve top vertices of a perimeter boundary of said enclosure, (d) twelve ground-anchor means, each outside of said perimeter boundary of said enclosure, and suitably connected into the ground approximately in line with said post and one vertex of said dodecagon floor shape, (e) twelve tension members, each suitably attached at one end to said anchor means and suitably attached at the opposite end to the nearest of said twelve top vertices of said perimeter boundary of said enclosure, and (f) a top cover suitably connected to said perimeter boundary of said enclosure.

2. An expandable and contractible multi-purpose shelter system as recited in claim 1, whereby said enclosures cluster together such that a maximum of six surround one in a manner that eliminates triangle prim interstitial volumes.

3. An expandable and contractible multi-purpose shelter system as recited in claim 1, wherein said dodecagon prisms, posts, tension members, anchor means and covers, are prefabricated, modular, connectable, and separable, thereby allowing for modification, transport, assembly, disassembly and re-assembly.

* * * * *

UNITED STATES PATENT AND TRADEMARK OFFICE
CERTIFICATE OF CORRECTION

PATENT NO. : 6,532,701 B2
DATED : March 18, 2003
INVENTOR(S) : Robert Edward Williams It is certified that error appears in the above-identified patent and that said Letters Patent is hereby corrected as shown below:

Column 1,
Line 54, "coninon" should read -- common --

Column 3,
Line 33, "ccu rising" should read -- comprising --
Line 35, "prislr" should read -- prism --.

Column 5,
Line 60, "nicol" should read -- nico --.

Column 8,
Line 65, "rust" should read -- post --.

Column 9,
Line 1, "mernbex" should read -- member --.

Column 10,
Line 4, "prim" should read -- prism --.

Signed and Sealed this

Twenty-second Day of July, 2003

JAMES E. ROGAN
*Director of the United States Patent and Trademark Office*